United States Patent Office 3,508,341
Patented Apr. 28, 1970

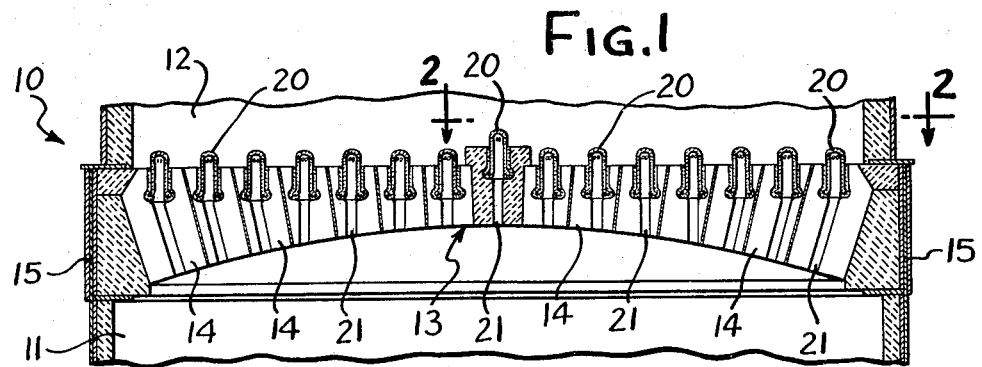
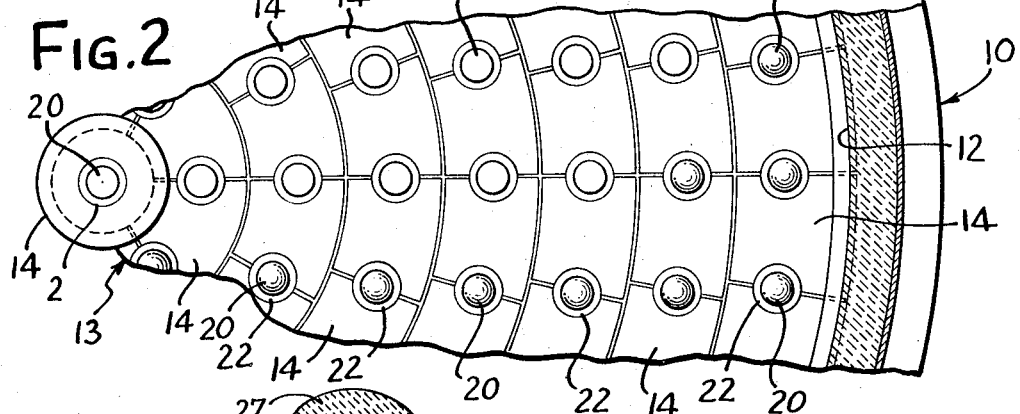
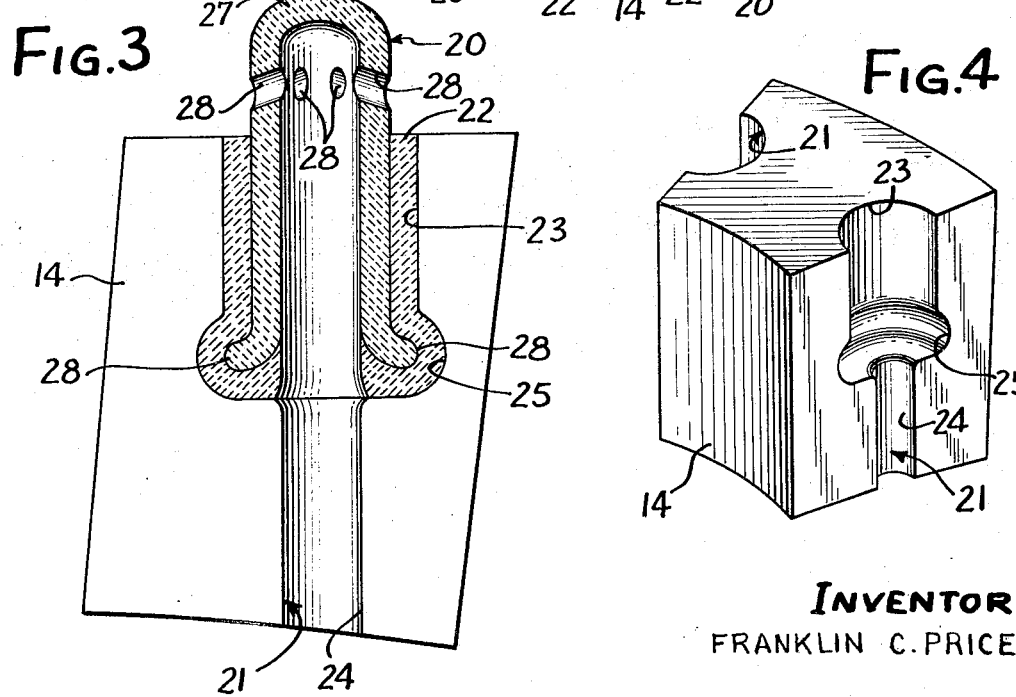
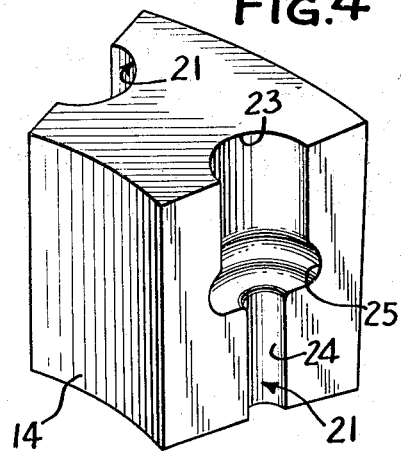
INVENTOR
FRANKLIN C. PRICE

3,508,341
FLUIDIZED BED HEARTH CONSTRUCTION
Franklin Carr Price, 33 W. 16th St.,
Chicago Heights, Ill. 60411
Filed May 29, 1968, Ser. No. 733,145
Int. Cl. F26b 17/00; F27b 3/22
U.S. Cl. 34—57                                    6 Claims

ABSTRACT OF THE DISCLOSURE

Tuyeres for fluidized bed reactor hearths are disclosed formed of refractory material in one piece with a flange about the lower end. The tuyeres are fitted in arch block defined passages having clearance for inserting a tuyere and an annular groove surrounding the tuyere flange. Refractory cement between the tuyere and the passage, and in the groove around the flange, fixes the tuyeres into place. The passages are angled so that the tuyeres are uniformly spaced over the hearth and a relatively uniform block size is maintained.

DESCRIPTION OF THE INVENTION

This invention relates generally to fluidized bed reactors and concerns, more particularly, an improved hearth construction for such reactors.

It is the primary aim of the invention to provide an improved reactor hearth having tuyeres formed of refractory material so that higher temperatures can be maintained in the bed than is possible with metal tuyers. A collateral object of the invention is to provide a tuyere and arch block design resulting in the tuyere being fixed in place by refractory cement loaded in compression.

A further object is to provide a hearth of the above type which permits uniform tuyere spacing, even to the periphery of large diameter beds, so as to get uniform gas distribution. In addition, maintaining uniform tuyere spacing at the edges of large beds results in a greater number of tuyeres in a large bed so that reactor capacity can be increased, or maintained at a lower gas pressure drop through the hearth.

Another object is to provide a tuyere and block design of the kind characterized above which permits optimum block sizes to be used, and the total arch structure to be designed for maximum stability.

It is also an object to provide a tuyere of the above character which can be conveniently and economically molded of ceramic material without internal stresses likely to cause fractures.

Other objects and advantages of the invention will become apparent upon reading the following detailed description and upon reference to the drawings, in which:

FIGURE 1 is a fragmentary vertical section taken through a hearth constructed in accordance with the invention;

FIG. 2 is an enlarged fragmentary plan taken approximately along the line 2—2 in FIG. 1;

FIG. 3 is an enlarged vertical section showing a single one of the tuyeres appearing in FIG. 1; and FIG. 4 is a perspective of one of the blocks making up the hearth of FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to the drawing, there is partially shown in FIG. 1 a fluidized bed reactor 10 having a lower windbox section 11, an upper reaction chamber 12 and a hearth 13 over which the fluidized bed, not shown, is supported in the chamber 12. As is conventional, the hearth is formed by arch tiles or blocks 14 shaped and assembled to define a masonry-type circular arch supported at its periphery by a collar structure 15.

The fluidized bed is created by transmitting gas, usually at high temperatures, up through the hearth 13 from the windbox section 11. By maintaining a vertical gas flow across the entire bottom of the reaction chamber 12, the material in the chamber is fluidized. Gas flow through the hearth is permitted and to some extent controlled by tuyeres 20 fitted in passages 21 defined by the blocks 14. The tuyeres are disposed in a pattern over the hearth.

In accordance with the invention, the tuyeres 20 are formed of ceramic refractory material and are shaped, along with the passages 21 in which they are fitted, so that refractory cement 22 loaded in compression holds the tuyeres in place. Each passage 21 has an upper portion 23 holding the tuyere 20, a lower portion 24 leading to the windbox section 11, and an annular groove 25 in the upper portion 23 adjacent the lower portion 24. The tuyeres 20 are substantially tubular bodies with closed upper ends 27 and open bottom ends having an adjacent flange 28 located in the annular groove 25. The mass of cement 22 is interposed about the flanges 28 in the groove 25, and between the tuyeres 20 and the upper portions 23 of the passages. Thus, the cement is loaded in compression upon any possible movement of the tuyeres relative to the blocks 14. Gas passages or ports 28 are formed in the tuyeres 20 adjacent their closed ends, and preferably these ports 28 slope downwardly in an outward direction to prevent material from the fluidized bed dropping through the tuyeres. These ports may be punched in the tuyere shape before firing, with the resulting rough edges ground after firing, in order to reduce friction losses of the gas in passing through the tuyere.

In the preferred construction, the tuyeres are of one-piece construction with the lower open end being flared outwardly to define the flange 28, and with all portions of the tuyere being substantially of the same thickness. The uniform cross section of the tuyere facilitates uniform cooling after the tuyere is molded and thus avoids development of internal thermal stresses likely to cause later fracturing and failure.

In the illustrated form, the tuyeres are inserted from the top of the passages 21. To this end, the passage upper portions 23 are of greater diameter than the lower portions 24, and the tuyere flanges 28 are of slightly lesser diameter than the upper portions 23. The tuyeres can thus be inserted down into position. This construction also permits the lower passage portions 24 to be formed with diameters substantially equal to the inner diameter of the tuyeres 20. As a result, each passage 21 and tuyere 20 defines a uniform gas flow cross section completely through the hearth 13.

Another important result of this construction is that the lower portions 24 of the passages 21 can be angled to conform with the angled sides of the blocks 14. This angling is present in the three outer courses of blocks making up the hearth 13. The advantage of this construction is two-fold. First, block sizes need not become appreciably greater toward the periphery of the hearth as would be necessary if the passages 21 extended vertically through these sharply angled blocks. Thus, an optimum block size can be maintained which is not too large for rapid curing and not too small for complexity reduced arch strength. Second, the tuyeres 20 can be uniformly spaced over the hearth when the block sizes are held substantially uniform. Uniform tuyere spacing gives a more uniform bed, and avoids having fewer tuyeres per unit of area at the outer edges of a large diameter hearth. Putting more tuyeres in a large diameter hearth permits an increased reactor capacity, or permits maintaining a lower gas pressure drop across the hearth for a capacity equal to reactors of the same size but having fewer tuyeres.

With the tuyeres being formed of ceramic refractory material, gas temperatures of 1800°–2000° F., or higher, can be readily handled by the reactor 10. Metal tuyeres usually impose a temperature limit of about 1100°–1200° F.

In order to most conveniently mold the passages 21 in the blocks 14, the passages are positioned along the radial block joints, as is most clearly shown in FIG. 4.

I claim as my invention:

1. A tuyere for fluidized bed reactor hearths comprising a ceramic, one-piece, substantially tubular body with one closed end, the open end of said body being flared outwardly to define a flange of substantially the same thickness as the body, and said body having gas passages located adjacent said closed end.

2. A fluidized bed reactor hearth comprising, in combination, arch blocks defining substantially vertical passages, said passages having a lower portion and an upper cylindrical portion, said upper portion having an annular groove of great diameter than the upper portion located adjacent said lower portion, a plurality of tuyeres positioned one in each one of said passages, said tuyeres being substantially tubular with a closed upper end and an open bottom end having an adjacent flange located in the annular groove of the respective passage in which the tuyere is located, and a mass of refractory cement interposed about each of said flanges in said grooves and between said tuyeres and said upper portions so as to fix the tuyeres in place.

3. The combination of claim 2 in which said tuyeres are formed of refractory material.

4. The combination of claim 3 in which said open-bottomed end of said tuyeres is flared outwardly to define said flanges and the tuyeres are of substantially uniform cross section throughout.

5. The combination of claim 2 in which said lower portion of the passages are substantially the same diameter as the inner diameter of said tubular tuyeres, said upper portions are of greater diameter than the lower portions of said passages, and said flanges are of lesser diameter than said upper portions.

6. The combination of claim 2 in which said blocks have angled sides interfitted to form a masonry-type arch, said lower portions of said passages conforming in direction to the more sharply angled blocks so that spacing of the tuyeres over the hearth is substantially uniform.

References Cited

UNITED STATES PATENTS

| | | | |
|---|---|---|---|
| 2,565,809 | 8/1951 | Goins. | |
| 2,841,476 | 7/1958 | Dalton | 23—284 |
| 3,057,701 | 10/1962 | Coates et al. | 23—284 |

JOHN J. CAMBY, Primary Examiner

U.S. Cl. X.R.

263—21; 23—284